United States Patent
Murata (10) Patent No.: US 11,719,031 B2
(45) Date of Patent: Aug. 8, 2023

(54) WINDOW REGULATOR

(71) Applicant: Johnan Manufacturing Inc., Nagano (JP)

(72) Inventor: Wataru Murata, Nagano (JP)

(73) Assignee: JOHNAN MANUFACTURING INC., Nagano (JP)

(*) Notice: Subject to any disclaimer, the term of this patent is extended or adjusted under 35 U.S.C. 154(b) by 82 days.

(21) Appl. No.: 17/360,181

(22) Filed: Jun. 28, 2021

(65) Prior Publication Data
US 2022/0018173 A1 Jan. 20, 2022

(30) Foreign Application Priority Data
Jul. 20, 2020 (JP) ................................ 2020-124020

(51) Int. Cl.
| | | |
|---|---|---|
| *E05D 15/16* | (2006.01) | |
| *B60J 1/17* | (2006.01) | |
| *B60J 5/04* | (2006.01) | |
| *E05F 15/697* | (2015.01) | |

(52) U.S. Cl.
CPC .............. *E05D 15/165* (2013.01); *B60J 1/17* (2013.01); *B60J 5/0468* (2013.01); *E05F 15/697* (2015.01); *E05Y 2900/55* (2013.01)

(58) Field of Classification Search
USPC .......................................................... 49/374
See application file for complete search history.

(56) References Cited

U.S. PATENT DOCUMENTS

| | | | | |
|---|---|---|---|---|
| 4,700,508 A | * | 10/1987 | Kollner ................. | E05F 11/486 |
| | | | | 49/374 |
| 5,970,658 A | * | 10/1999 | Smith .................... | E05F 11/382 |
| | | | | 49/352 |

(Continued)

FOREIGN PATENT DOCUMENTS

| | | |
|---|---|---|
| JP | 2005-139706 A | 6/2005 |
| JP | 2008-95364 A | 4/2008 |
| WO | 2013/150823 A1 | 10/2013 |

OTHER PUBLICATIONS

Office Action issued in the corresponding Japanese Patent Application No. 2020-124020 dated Apr. 19, 2022.

(Continued)

*Primary Examiner* — Marcus Menezes
(74) *Attorney, Agent, or Firm* — Thomas W. Cole; Calderon Safran & Cole P.C.

(57) ABSTRACT

A window regulator includes a guide rail, a carrier plate, and a raising/lowering means to raise/lower the carrier plate along the guide rail. The carrier plate includes a front surface sliding member configured to slide on a front surface of a flange portion of the guide rail and a back surface sliding member configured to slide on a back surface of the flange portion. The back surface sliding member includes a contact portion coming into contact with the back surface and a base portion that presses the contact portion against the back surface by a restoring force of elastic deformation. The contact portion extends toward the back surface and is elastically deformed and bent on the end side to allow the flange portion to enter from a lateral side in an extending direction thereof when assembling the carrier plate to the guide rail.

2 Claims, 9 Drawing Sheets

(56) References Cited

U.S. PATENT DOCUMENTS

| | | | | | |
|---|---|---|---|---|---|
| 6,052,947 | A | * | 4/2000 | Smith | E05F 11/382 49/374 |
| 6,553,720 | B2 | * | 4/2003 | Merlet | E05F 11/382 49/440 |
| 6,810,623 | B2 | * | 11/2004 | Messlez | E05F 11/483 49/374 |
| 7,617,633 | B2 | * | 11/2009 | Shimura | E05F 11/382 49/352 |
| 9,341,012 | B2 | * | 5/2016 | Yamamoto | E05F 15/689 |
| 2002/0139052 | A1 | * | 10/2002 | Messiez | E05F 11/385 49/375 |
| 2008/0086949 | A1 | * | 4/2008 | Shimura | E05F 11/382 49/374 |
| 2020/0408026 | A1 | * | 12/2020 | Takaoka | E05F 15/689 |
| 2022/0018173 | A1 | * | 1/2022 | Murata | E05D 15/165 |
| 2022/0025687 | A1 | * | 1/2022 | Shiroma | E05F 11/486 |

OTHER PUBLICATIONS

Office Action issued in the corresponding Chinese Patent Application No. 202110813258.3 dated Sep. 27, 2022; 14 pages.

\* cited by examiner

WINDOW REGULATOR

CROSS-REFERENCE TO RELATED APPLICATIONS

The present patent application claims the priority of Japanese patent application No. 2020/124020 filed on Jul. 20, 2020, and the entire contents of Japanese patent application No. 2020/124020 are hereby incorporated by reference.

TECHNICAL FIELD

The present invention relates to a window regulator.

BACKGROUND ART

A single-rail type window regulator is known that is provided with a guide rail supporting a carrier plate so as to be ascendable/descendible and raises/lowers a window glass by raising/lowering the carrier plate along the guide rail (see Patent Literature 1 below). In the window regulator, the carrier plate (slider) has a first sliding fin (elastic lip) elastically in contact with a back surface of a flange portion of the guide rail and second and third sliding fins elastically in contact with a front surface of the flange portion of the guide rail, and rattle of the carrier plate is suppressed by sandwiching and holding the flange portion with the three sliding fins. The first sliding fin has a contact portion having a circular cross section, and the second and third sliding fins each have an arc-shaped contact portion composed of a contact section coming into contact with the flange portion and a turn-back section that turns back from the contact section to the opposite side to the flange portion. Since the turn-back sections are formed on the contact portions of the second and third sliding fins, a front edge of the flange portion entering between the first sliding fin and the second/third sliding fins is not caught by the contact portion when assembling the carrier plate to the guide rail from a lateral side. This prevents an assembly defect from occurring.

CITATION LIST

Patent Literature

Patent Literature 1: JP 2005/139706 A

SUMMARY OF INVENTION

The window regulator described above, however, may cause a problem that a front edge of the flange portion entering between the first sliding fin and the second/third sliding fins is caught by the contact portion of the first sliding fin when assembling the carrier plate to the guide rail from the lateral side, causing an assembly defect. To address the problem, an alteration may be made so as to adopt the shape of the second and third sliding fins to that of the first sliding fin. However, in the alteration, another problem may arise that the contact portion cannot be properly pressure-contacted with the flange portion when a width of the flange portion is small since the turn-back section comes into contact with a side plate portion adjacent to the flange portion.

It is an object of the invention to provide a window regulator that allows the contact portion to be properly pressure-contacted with the flange portion even when the width of the flange portion is small as well as preventing the assembly defect of the carrier plate.

According to an embodiment of the invention, a window regulator comprises:
- a guide rail along an ascending/descending direction of a window glass;
- a carrier plate to slide on the guide rail to move with the window glass; and
- a raising/lowering means to raise/lower the carrier plate along the guide rail,
- wherein the carrier plate comprises a front surface sliding member configured to slide on a front surface of a flange portion of the guide rail and a back surface sliding member configured to slide on a back surface of the flange portion,
- wherein the back surface sliding member comprises a contact portion coming into contact with the back surface and a base portion that presses the contact portion against the back surface by a restoring force of elastic deformation, and
- wherein the contact portion extends toward the back surface and is elastically deformed and bent on the end side to allow the flange portion to enter from a lateral side in an extending direction thereof when assembling the carrier plate to the guide rail.

Advantageous Effects of Invention

According to an embodiment of the invention, a window regulator can be provided that allows the contact portion to be properly pressure-contacted with the flange portion even when the width of the flange portion is small as well as preventing the assembly defect of the carrier plate.

DESCRIPTION OF EMBODIMENTS

A window regulator in an embodiment of the invention will be described below in reference to the appended drawings. This window regulator is a raising/lowering device that is installed in a door panel of an automobile (a vehicle) and raises/lowers a window glass of a door provided on the automobile. In this window regulator, particularly a sliding structure of the carrier plate on the guide rail is improved so that an assembly defect does not occur and the carrier plate can be used with a guide rail having a narrow flange portion. Hereinafter, an ascending/descending direction, an ascending direction and a descending direction of the window glass are simply referred to as the ascending/descending direction, the ascending direction and the descending direction. In addition, left, right, front, rear, up and down used in the following description are as defined in each drawing.

Figure 1:
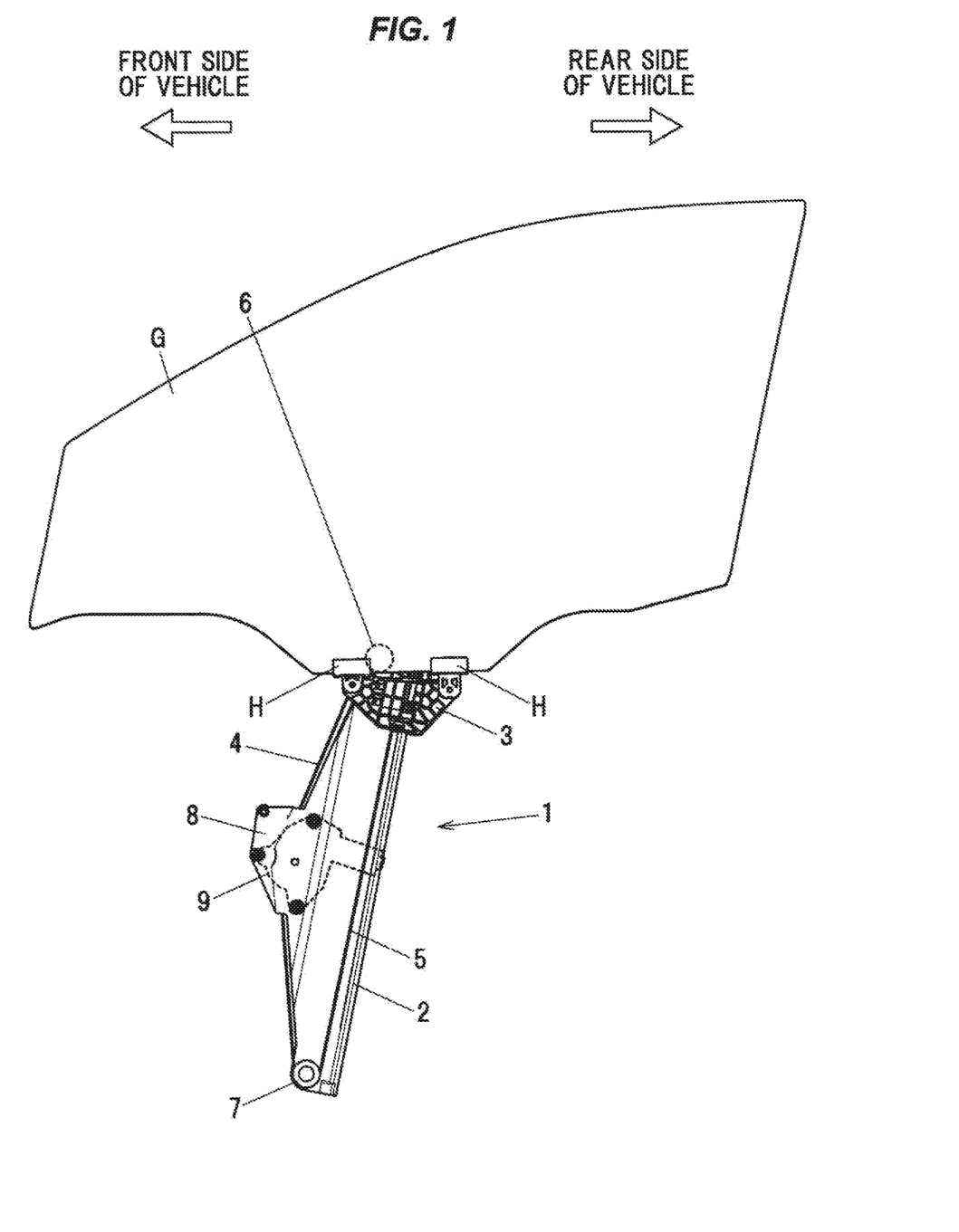
FIG. 1 is a general schematic diagram illustrating a window regulator in an embodiment of the present invention and a window glass.
Figure 2A:
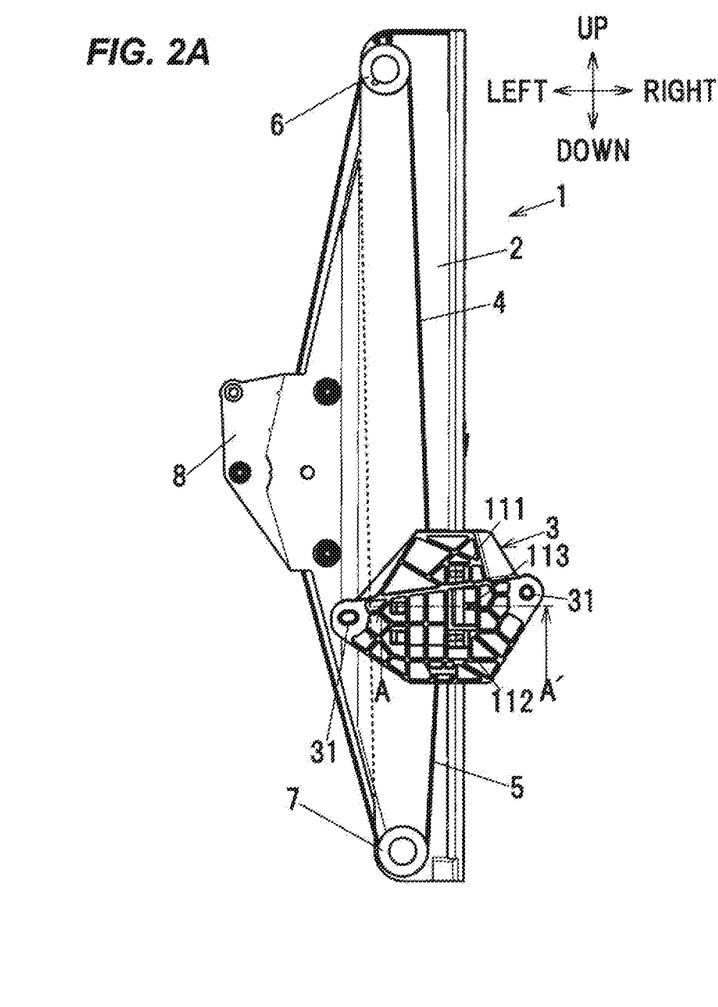
FIG. 2A is a front view showing the window regulator.
Figure 2B:
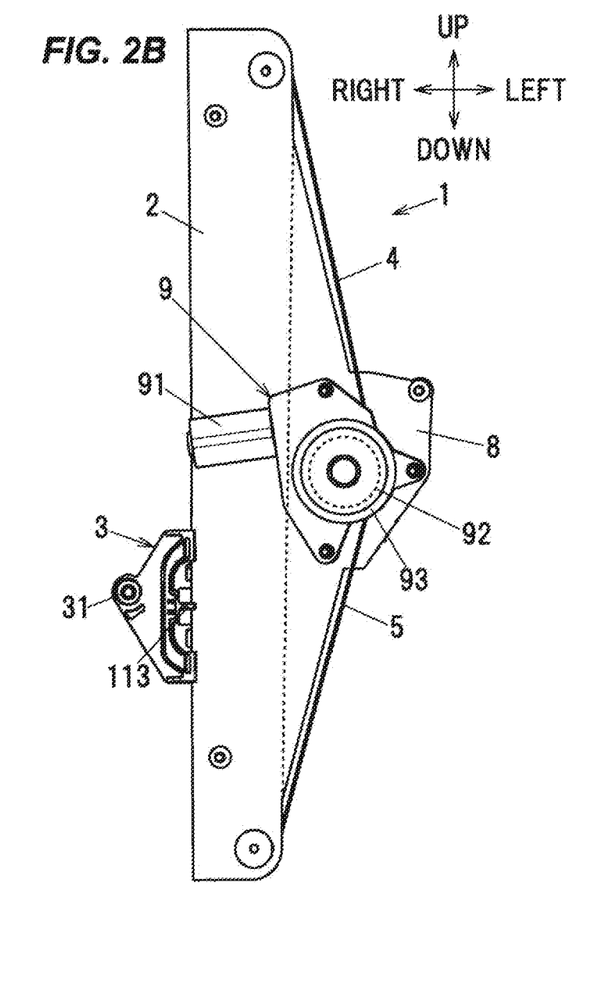
FIG. 2B is a back view of the window regulator.

As shown in FIGS. 1 and 2A-2B, a window regulator 1 is installed inside a door panel (not shown) and includes a guide rail 2 formed of a resin and provided along the ascending/descending direction of a window glass G, a carrier plate 3 to which the window glass G is attached via glass holders H and which slides on the guide rail 2 and moves together with the window glass G, an ascending-side wire 4 and a descending-side wire 5 that pull the carrier plate 3, a pair of upper and lower pulleys 6, 7 provided at upper and lower ends of the guide rail 2 to change the direction of the ascending-side wire 4 and the descending-side wire 5, and a drive unit 9 that is supported at a middle position of the guide rail 2 in an up-down direction via a base plate 8 and is provided to take up and feed out the ascending-side wire 4 and the descending-side wire 5. That is, the window regulator 1 is a so-called wire-type single rail window regulator 1. It is also a so-called banjo-type window regulator 1 in which the drive unit 9 is supported at a middle position of the guide rail 2 in the up-down direction. A raising/lowering means for raising/lowering the carrier plate 3 along the guide rail 2 is composed of the ascending-side wire 4, the descending-side wire 5, the pulleys 6, 7 and the drive unit 9.

The ascending-side wire 4 is attached to the carrier plate 3 at one end, passes through the upper pulley 6, and is coupled to a drum 92 of the drive unit 9 (described later) at the other end. Meanwhile, the descending-side wire 5 is attached to the carrier plate 3 at one end, passes through the lower pulley 7, and is coupled to the drum 92 at the other end.

The drive unit 9 is supported by the guide rail 2 via the resin base plate 8, and has a motor 91 with reducer, the cylindrical drum 92 that is rotationally driven by the motor 91 and rotates to take up and feed out the ascending-side wire 4 and the descending-side wire 5, and a motor housing 93 that holds the motor 91 and also covers the drum 92. The guide rail 2 and the base plate 8 are integrally molded.

When the motor 91 is driven in forward, the drum 92 rotates in the forward direction and takes up the ascending-side wire 4 while feeding out the descending-side wire 5. Thus, the carrier plate 3 is pulled by the ascending-side wire 4 and moves in the ascending direction. As a result, the window glass G attached to the carrier plate 3 ascends. On the other hand, when the motor 91 is driven in reverse, the drum 92 rotates in the reverse direction and takes up the descending-side wire 5 while feeding out the ascending-side wire 4. Thus, the carrier plate 3 is pulled by the descending-side wire 5 and moves in the descending direction. As a result, the window glass G attached to the carrier plate 3 descends. The carrier plate 3 and the window glass G are raised/lowered along the guide rail 2 in this manner.

Figures 3A, 3B:
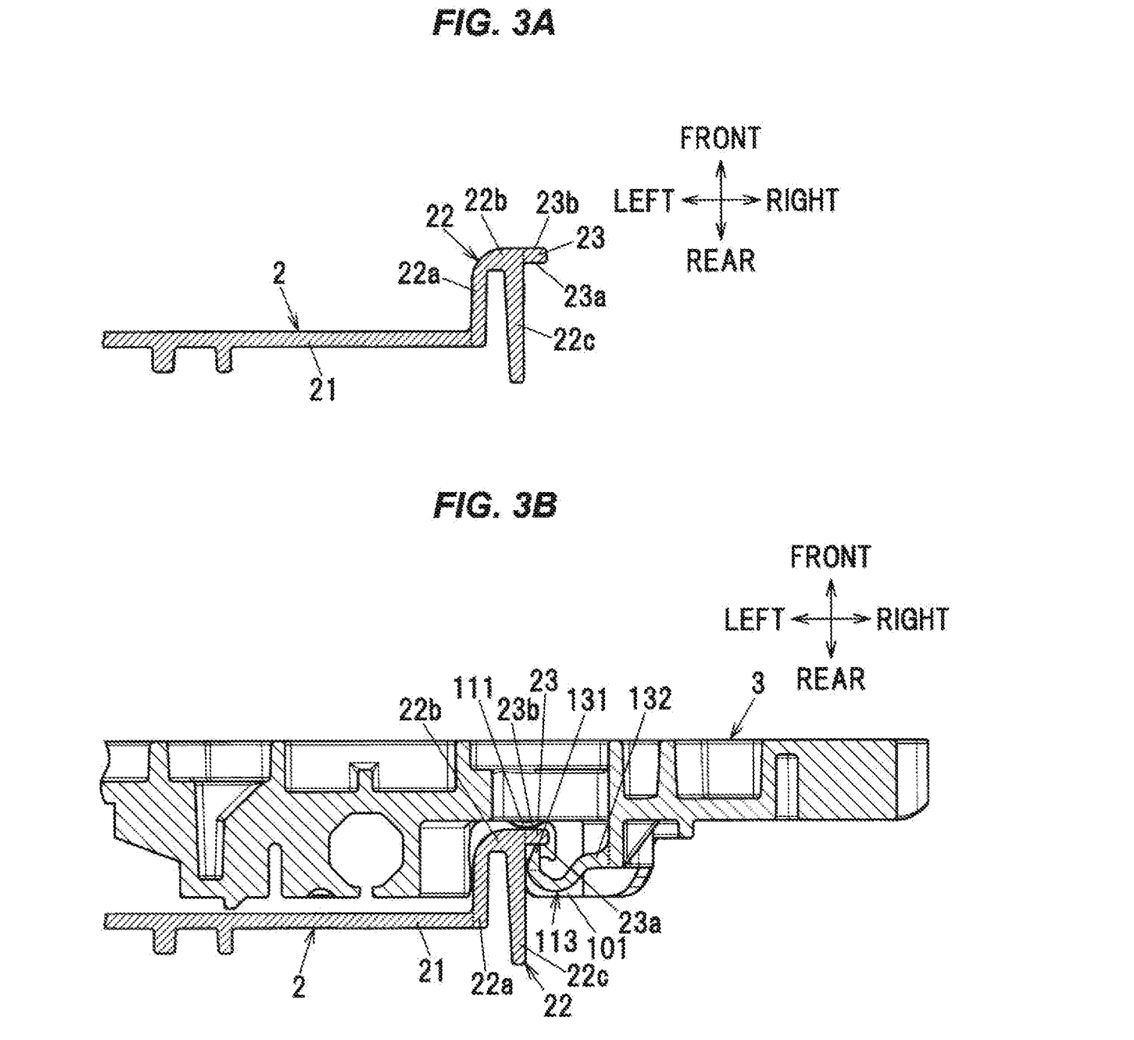
FIG. 3A is a cross sectional view showing a guide rail and taken along a line A-A' in FIG. 2A.
FIG. 3B is a cross sectional view showing a carrier plate and the guide rail and taken along the line A-A'.

As shown in FIGS. 2A-2B and 3A-3B, the guide rail 2 is a long member formed of a resin and slightly curved so as to bulge toward the outside of a compartment in a vehicle width direction, and has a flat plate portion 21 extending along a longitudinal direction thereof, a side plate portion 22 formed to rise toward the front side from a right edge of the flat plate portion 21 in a lateral direction, and a flange portion 23 protruding rightward from a front end of the side plate portion 22 and formed parallel to the flat plate portion 21. The side plate portion 22 is composed of a first side plate 22a rising toward the front side from the right edge of the flat plate portion 21, a flat plate 22b extending rightward from a front end of the first side plate 22a, and a second side plate 22c rising toward the rear from a right end of the flat plate 22b. As shown in FIG. 3B, the side plate portion 22 and the flange portion 23 are sliding portions on which the carrier plate 3 slides during an ascending/descending operation of the window regulator 1, and extend over the entire ascending/descending range of the carrier plate 3. Hereinafter, a rearward surface of the flange portion 23, e.g., a surface adjacent to the side plate portion 22 is referred to as a back surface 23a of the flange portion 23, and a forward surface of the flange portion 23, e.g., a surface not adjacent to the side plate portion 22 is referred to as a front surface 23b of the flange portion 23.

Figure 4A:
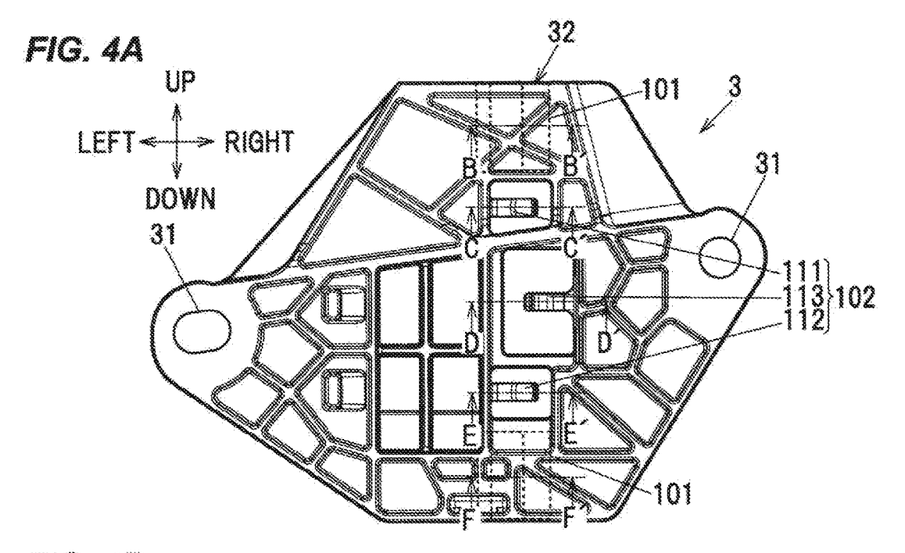
FIG. 4A is a front view showing the carrier plate.
Figure 4B:
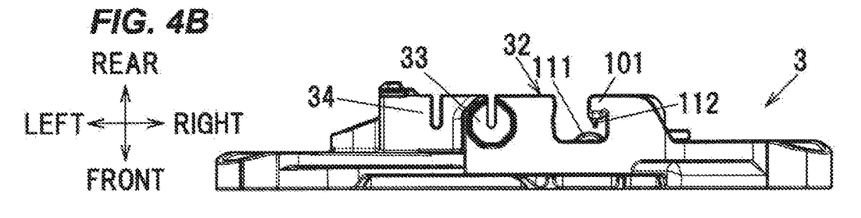
FIG. 4B is a plan view of the carrier plate.
Figure 4C:
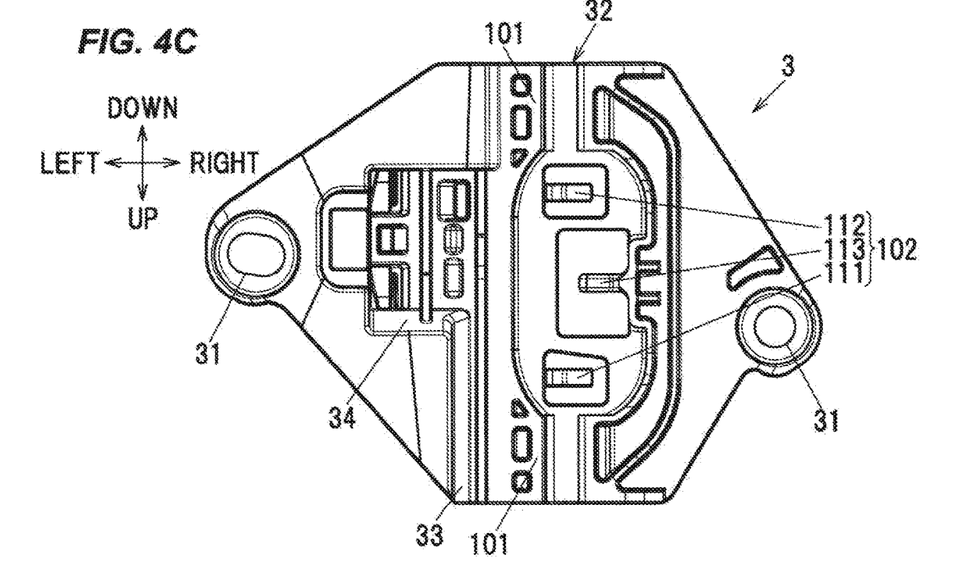
FIG. 4C is a back view of the carrier plate.

Next, the carrier plate 3 will be described in reference to FIGS. 4A to 6C. FIGS. 5A-5E are the cross sectional views showing the carrier plate 3 of FIGS. 4A-4C with the guide rail 2 when taking along the respective section lines. As shown in FIGS. 4A-4C, the carrier plate 3 is a member formed of a resin (e.g., formed of a polyacetal resin) and has two (right and left) attachment holes 31, 31 for attaching the window glass G, a rail attachment portion 32 arranged on the rearward surface side at substantially the center in the right-left direction (in the middle and the far side of FIG. 4A), a descending-side wire attachment portion 33 arranged adjacent to the rail attachment portion 32 on the left, and an ascending-side wire attachment portion 34 arranged adjacent to the descending-side wire attachment portion 33 on the left.

The attachment holes 31, 31 are for attaching the glass holders H (see FIG. 1) that are fixed to the window glass G. The window glass G is attached to the carrier plate 3 via the glass holders H by attaching the glass holders H to the attachment holes 31, 31.

One end of the descending-side wire 5 is attached to the descending-side wire attachment portion 33. One end of the ascending-side wire 4 is attached to the ascending-side wire attachment portion 34. That is, it is configured such that the carrier plate 3 is pulled in the descending direction by the descending-side wire 5 via the descending-side wire attachment portion 33 and is pulled in the ascending direction by the ascending-side wire 4 via the ascending-side wire attachment portion 34.

Figure 5A:
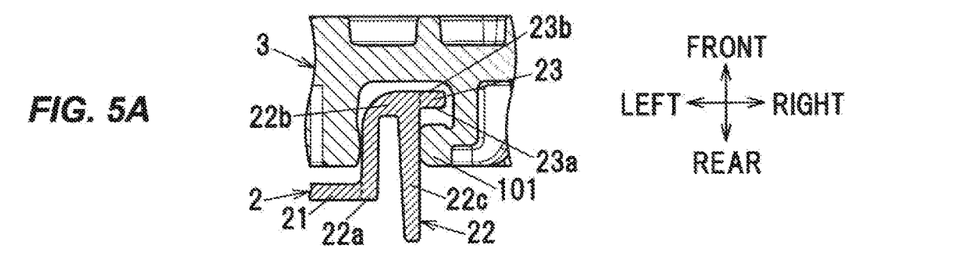
FIG. 5A is a cross sectional view showing the carrier plate and the guide rail and taken along a line B-B' in FIG. 4A.

The rail attachment portion 32 has a pair of upper and lower side plate sliding portions 101 that are arranged at upper and lower ends of the carrier plate 3 and slide against the side plate portion 22, and a flange sliding portion 102 that is arranged at a middle position of the carrier plate 3 in the up-down direction and slides against the flange portion 23 of the guide rail 2. As shown in FIGS. 5A and 5E, the side plate sliding portions 101 slide against the right surface and the left surface of the side plate portion 22 of the guide rail 2 and sandwich and holds the side plate portion 22 of the guide rail 2.

As shown in FIGS. 4A-4C, the flange sliding portion 102 has a first front surface sliding fin 111 and a second front surface sliding fin 112 (the front surface sliding members) that slide against the front surface 23b (the forward surface) of the flange portion 23, and a back surface sliding fin 113 (the back surface sliding member) that slides against the back surface 23a (the rearward surface) of the flange portion 23. The first front surface sliding fin 111, the second front surface sliding fin 112 and the back surface sliding fin 113 are arranged at the middle position of the carrier plate 3 in the up-down direction and are aligned in the up-down direction in the order of the first front surface sliding fin 111, the back surface sliding fin 113 and the second front surface sliding fin 112 from the upper side. That is, the back surface sliding fin 113 is arranged between the first front surface sliding fin 111 and the second front surface sliding fin 112 in the up-down direction. The sliding portion 102 sandwiches and holds the flange portion 23 of the guide rail 2 by the front surface sliding fins 111, 112 and the back surface sliding fin 113 that are pressure-contacted with the front surface 23b and the back surface 23a of the flange portion 23 of the guide rail 2. Rattle of the carrier plate 3 in the front-back direction is thereby suppressed. As a result, fluttering of the carrier plate 3 when opening or closing the door is suppressed, and generation of abnormal noise due to the fluttering of the carrier plate 3 is suppressed.

Figure 5B:
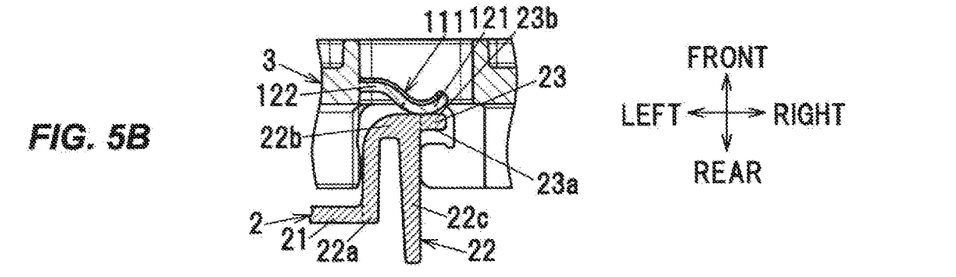
FIG. 5B is a cross sectional view showing the carrier plate and the guide rail and taken along a line C-C' in FIG. 4A.
Figure 5C:
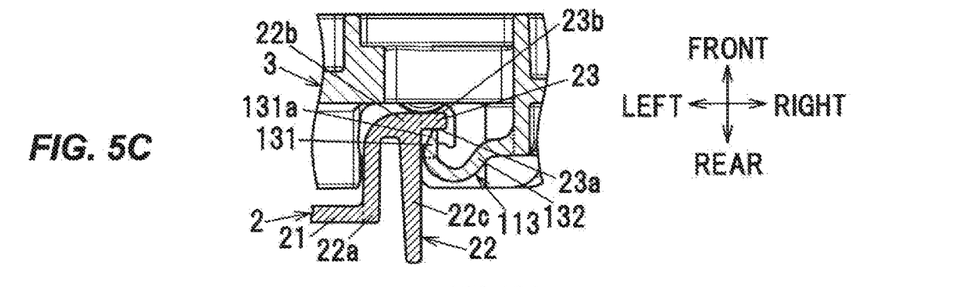
FIG. 5C is a cross sectional view showing the carrier plate and the guide rail and taken along a line D-D' in FIG. 4A.
Figure 5D:
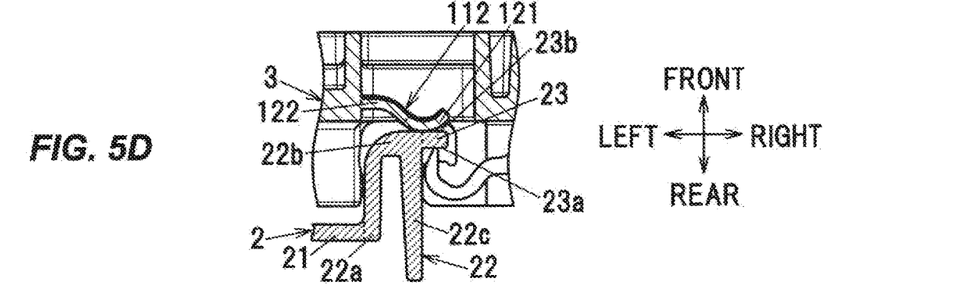
FIG. 5D is a cross sectional view showing the carrier plate and the guide rail and taken along a line E-E' in FIG. 4A.
Figure 5E:
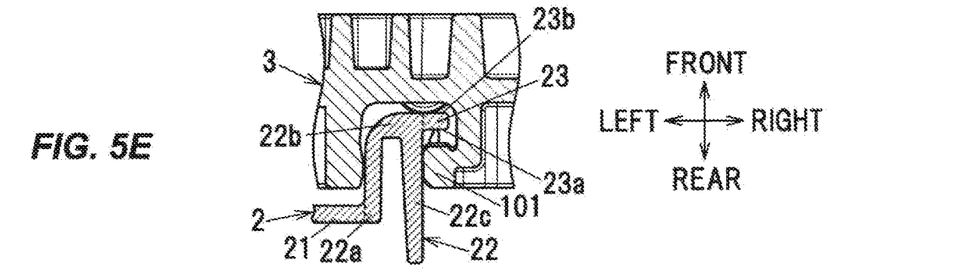
FIG. 5E is a cross sectional view showing the carrier plate and the guide rail and taken along a line F-F' in FIG. 4A.

As shown in FIGS. 5B and 5D, the front surface sliding fins 111, 112 are members protruding from left inner surfaces of openings formed on the carrier plate 3 and each have a contact portion 121 coming into contact with the front surface 23b of the flange portion 23, and a base portion 122 that supports the contact portion 121 and presses the contact portion 121 against the front surface 23b of the flange portion 23. The base portion 122 presses the contact portion 121 against the front surface 23b of the flange portion 23 by a restoring force of elastic deformation. That is, when the base portion 122 is in a natural state, a rear end of the contact portion 121 is located on the rear side with respect to the front surface 23b of the flange portion 23. Meanwhile, in a state in which the carrier plate 3 is assembled to the guide rail 2, the contact portion 121 is pushed toward the front by the front surface 23b of the flange portion 23 and the base portion 122 is elastically deformed. The contact portion 121 is pressed against the front surface 23b of the flange portion 23 by a restoring force of this elastic deformation and is pressure-contacted with the front surface 23b of the flange portion 23.

The contact portion 121 has a curved shape that extends from an end of the base portion 122, comes close to the flange portion 23 and then turns back to the opposite side to the flange portion 23.

As shown in FIG. 5C, the back surface sliding fin 113 is a member protruding from a right inner surface of an opening formed on the carrier plate 3 and has a contact portion 131 coming into contact with the back surface 23a of the flange portion 23, and a base portion 132 that supports the contact portion 131 and presses the contact portion 131 against the back surface 23a of the flange portion 23. The base portion 132 has an "S" shape that extends toward the left from the right inner surface of the opening, is curved toward the opposite side to the flange portion 23, and is then curved toward the flange portion 23. In addition, the base portion 132 presses the contact portion 131 against the back surface 23a of the flange portion 23 by the restoring force of elastic deformation. That is, when the base portion 132 is in a natural state, an end (a front end) of the contact portion 131 is located on the front side with respect to the back surface 23a of the flange portion 23. Meanwhile, in a state in which the carrier plate 3 is assembled to the guide rail 2, the contact portion 131 is pushed toward the rear and the base portion 132 is elastically deformed.

The contact portion 131 has a shape that forwardly extends (runs) from the end of the base portion 132 toward the back surface 23a of the flange portion 23. In addition, the contact portion 131 is configured that the end side of the contact portion 131 is elastically deform and bent toward the right side to allow for entry of the flange portion 23 from a lateral side (left side) in the extending direction thereof when assembling the carrier plate 3 to the guide rail 2. That is, when assembling the carrier plate 3, the contact portion 131 is bent in the entry direction of the flange portion 23 and allows the flange portion 23 to enter between the front surface sliding fins 111, 112 and the back surface sliding fin 113. Thus, the front edge of the flange portion 23 is not caught by the contact portion 131 when assembling the carrier plate 3 to the guide rail 2. In addition, the contact portion 131 is configured to return to the natural state once the flange portion 23 enters between the front surface sliding fins 111, 112 and the back surface sliding fin 113, while causing elastic deformation of the base portion 132 by pressing the base portion 132 toward the rear with the restoring force of elastic deformation. In the state in which the flange portion 23 has entered between the front surface sliding fins 111, 112 and the back surface sliding fin 113, the base portion 132 is elastically deformed and the contact portion 131 has returned to the natural state, the contact portion 131 in a non-deformed state is pressed against the back surface 23a of the flange portion 23 by the restoring force of elastic deformation of the contact portion 131, and the contact portion 131 is pressure-contacted with the back surface 23a of the flange portion 23. As such, the back surface sliding fin 113 is configured that the contact portion 131 serves as a first elastic deformation portion for allowing entry of the flange portion 23 when assembling the carrier plate 3, and the base portion 132 serves as a second elastic deformation position for bringing the contact portion 131 into pressure contact with the back surface 23a of the flange portion 23.

In addition, an inclined surface 131a inclined in the entry direction of the flange portion 23 (in the right direction) from the base side to the end side of the contact portion 131 is formed on a lateral surface (left surface) of the contact portion 131 on the side from which the flange portion 23 enters. Since the front edge of the flange portion 23 is guided by the inclined surface 131a, the flange portion 23 can easily enter between the front surface sliding fins 111, 112 and the back surface sliding fin 113.

Now, a behavior of the back surface sliding fin 113 during an assembling work for assembling the carrier plate 3 to the guide rail 2 will be described in reference to FIG. 6. In this assembling work, the carrier plate 3 is assembled to the guide rail 2 from the lateral side in such a manner that the flange portion 23 of the guide rail 2 is rotated and inserted into the rail attachment portion 32 of the carrier plate 3 and the flange portion 23 is advanced between the front surface sliding fins 111, 112 and the back surface sliding fin 113. Although the guide rail 2 is moved and assembled to the stationary carrier plate 3 in FIG. 6, the carrier plate 3 may be moved and assembled to the stationary guide rail 2 as long as it is configured that the flange portion 23 of the guide rail 2 is relatively rotated and inserted into the rail attachment portion 32 of the carrier plate 3 and the flange portion 23 is advanced between the front surface sliding fins 111, 112 and the back surface sliding fin 113.

Figure 6A:
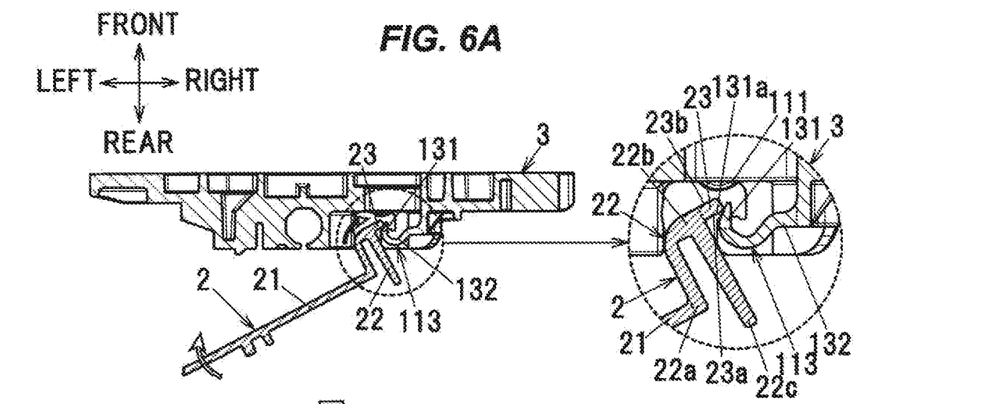
FIGS. 6A-6C are cross sectional views taken along the line A-A' and showing a behavior of a back surface sliding fin when assembling the carrier plate to the guide rail.
Figure 6B:
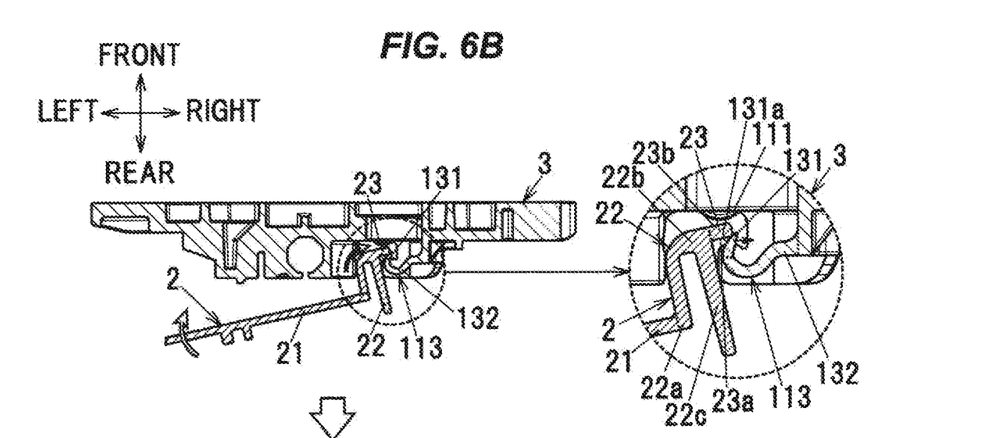
Figure 6C:
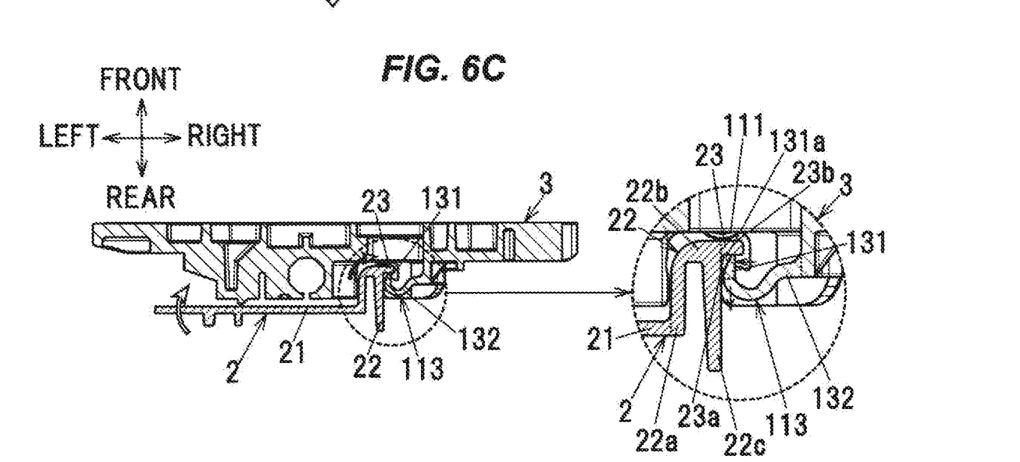

As shown in FIG. 6A, when the flange portion 23 of the guide rail 2 is rotated and inserted into the rail attachment portion 32 of the carrier plate 3, the front edge of the flange portion 23 firstly comes into contact with the inclined surface 131a of the contact portion 131 from the left. When the guide rail 2 is subsequently further rotated and inserted, the end side of the contact portion 131 of the back surface sliding fin 113 is pressed by the front edge of the flange portion 23 and is elastically deformed and bent toward the right side to allow for entry of the flange portion 23, as shown in FIG. 6B. Then, when further rotated and inserted, the flange portion 23 climbs on the contact portion 131 and enters between the front surface sliding fins 111, 112 and the back surface sliding fin 113, as shown in FIG. 6C. At this time, the contact portion 131 returns to the natural state in which the contact portion 131 extends toward the flange portion 23, while causing elastic deformation of the end of the base portion 132 by pushing it down toward the rear side with the restoring force of elastic deformation. Thus, the contact portion 131 in a non-deformed state is pressed against the back surface 23a of the flange portion 23 by the restoring force of elastic deformation of the base portion 132, and the contact portion 131 is pressure-contacted with the back surface 23a of the flange portion 23. In this regard, when the contact portion 131 returns to the natural state, the end side of the contact portion 131 comes into contact with the side plate portion 22, which generates attachment sound and click feeling.

Functions and Effects of the Embodiment

Figure 7A:
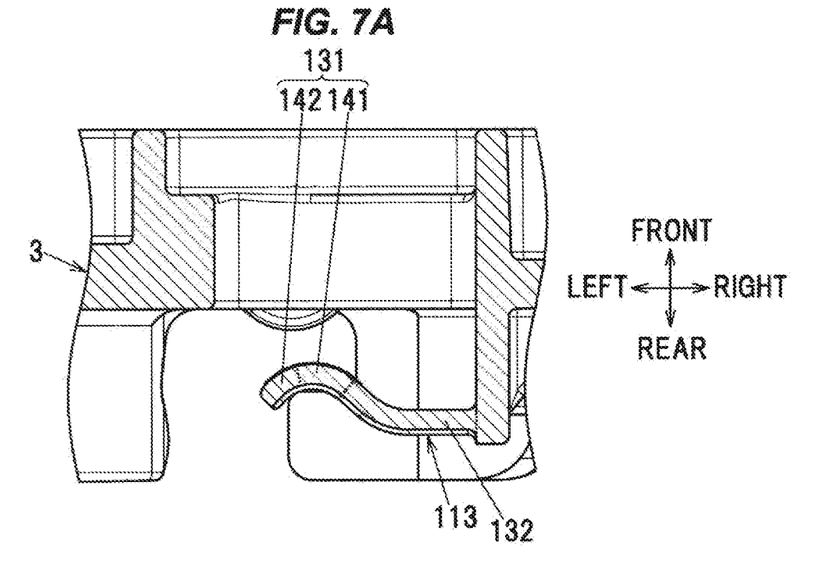
FIG. 7A is a cross sectional view showing the back surface sliding fin of a known window regulator.
Figure 7B:
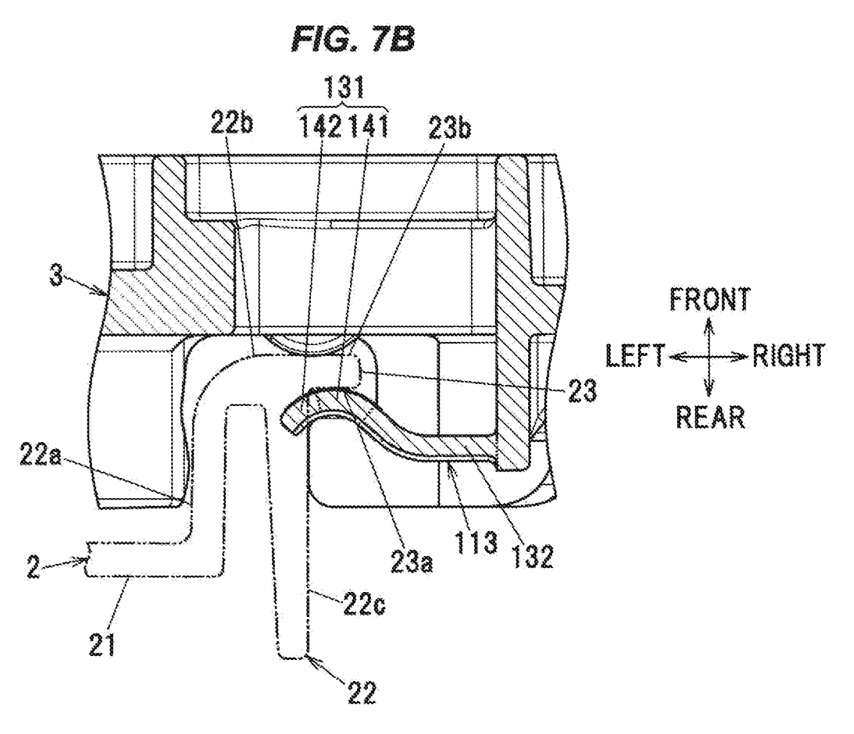
FIG. 7B is a cross sectional view showing the guide rail and the back surface sliding fin of the known window regulator.

In the embodiment described above, since the contact portion 131 of the back surface sliding fin 113 elastically deforms so as to allow for entry of the flange portion 23 when assembling the carrier plate 3 to the guide rail 2, an assembly defect due to the front edge of the flange portion 23 caught by the contact portion 131 when assembling the carrier plate 3 to the guide rail 2 does not occur. In the known window regulator, the contact portion 131 of the back surface sliding fin 113 is composed of a contact section 141 coming into contact with the flange portion 23 and a turn-back section 142 that turns back from the contact section 141 to the opposite side to the flange portion 23 as shown in FIG. 7A, and there is thus a problem that the turn-back section 142 comes into contact with the side plate portion 22 when the width of the flange portion 23 is small as shown in FIG. 7B. On the other hand, in the embodiment described above, the contact position with the flange portion 23 can be closer to the side plate portion 22 since no portion comes into contact with the side plate portion 22, and the contact portion 131 can be properly brought into pressure contact with the flange portion 23 even when the width of the flange portion 23 is small. The width of the flange portion 23 thus can be reduce, resulting in that it is possible to reduce the weight of the guide rail 2 and also improve strength of the flange portion 23. As a result, even when the guide rail 2 is formed of a resin, its strength can be equal to or greater than that of a metal guide rail and the weight can be equal to or less than that of the metal guide rail.

In addition, since it is not configured to insert the flange portion 23 between the front surface sliding fins 111, 112 and the back surface sliding fin 113 while rearwardly pushing and opening the back surface sliding fin 113 when assembling the carrier plate 3 to the guide rail 2, the base portion 132 is not excessively deformed at the time of assembling the carrier plate 3 and it is possible to prevent an excessive load from acting on the base portion 132. Thus, it is possible to prevent damage on the base portion 132.

Other Embodiments

Figure 8A:
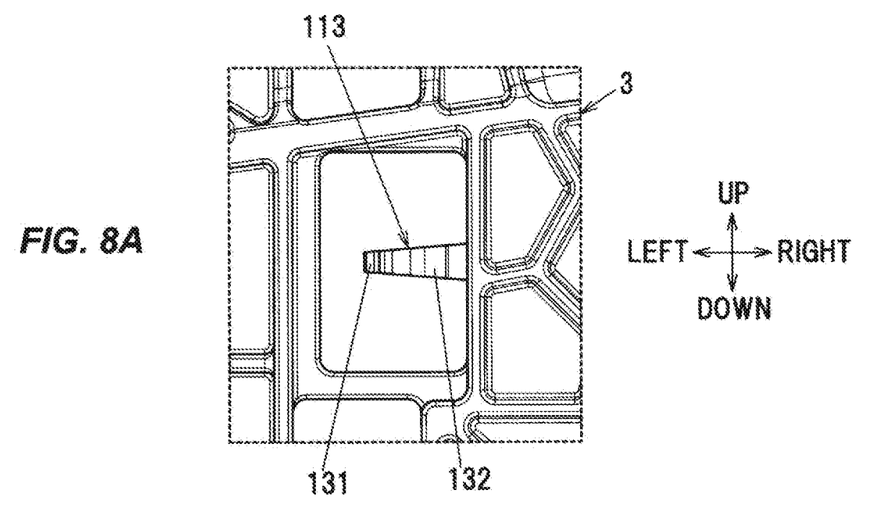
FIG. 8A is a plan view showing a first modification of the back surface sliding fin.
Figure 8B:
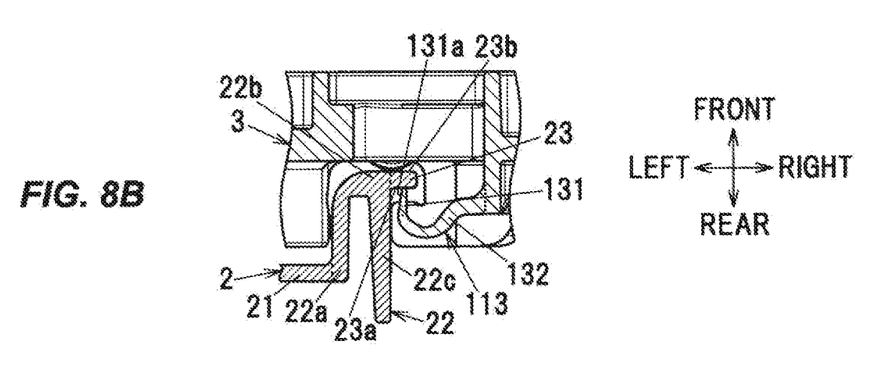
FIG. 8B is a cross sectional view showing a second modification of the back surface sliding fin.

Although the width (dimension in the up-down direction) of the back surface sliding fin 113 is the same in the right-left direction in the embodiment described above, the width of the back surface sliding fin 113 may gradually decrease (may be tapered) from right to left as shown in FIG. 8A. In other words, the width of the contact portion 131 may be smaller than the width of the base portion 132. In addition, although the back surface sliding fin 113 has the same thickness at the contact portion 131 and the base portion 132 in the embodiment described above, the thickness of the contact portion 131 may be smaller than the thickness of the base portion 132, as shown in FIG. 8B. With these configurations, the contact portion 131 can deform more easily and it is possible to further prevent the front edge of the flange portion 23 from being caught by the contact portion 131 when assembling the carrier plate 3.

Figure 8C:
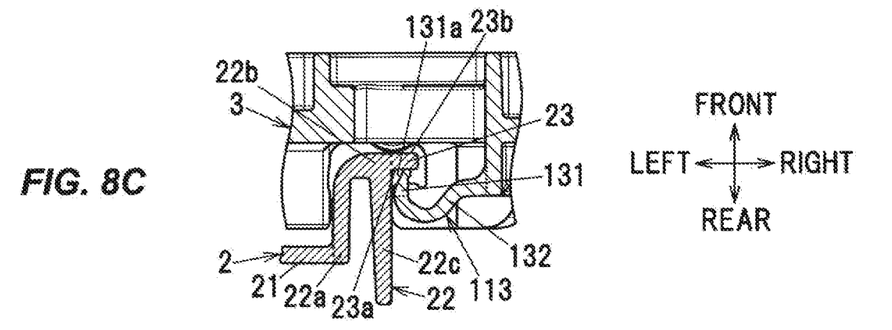
FIG. 8C is a cross sectional view showing a third modification of the back surface sliding fin.

Furthermore, the end of the contact portion 131 may be rounded such that the end of the contact portion 131 is formed circular in cross section next to the inclined surface 131a, as shown in FIG. 8C. With such a configuration, it is possible to further prevent the front edge of the flange portion 23 from being caught by the contact portion 131 when assembling the carrier plate 3.

Figure 9A:
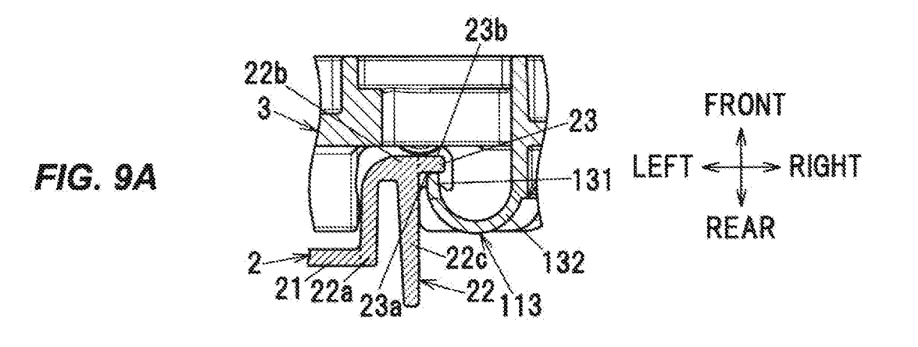
FIG. 9A is a cross sectional view showing a fourth modification of the back surface sliding fin.

In addition, although the base portion 132 is formed in an "S" shape in the embodiment described above, the base portion 132 may be formed to have a semicircular arc shape with the apex on the opposite side to the flange portion 23 (on the rear side), as shown in FIG. 9A.

Figure 9B:
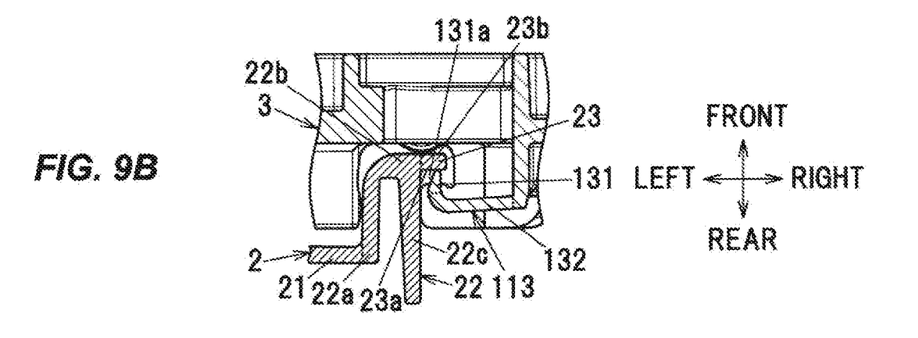
FIG. 9B is a cross sectional view showing a fifth modification of the back surface sliding fin.
Figure 9C:
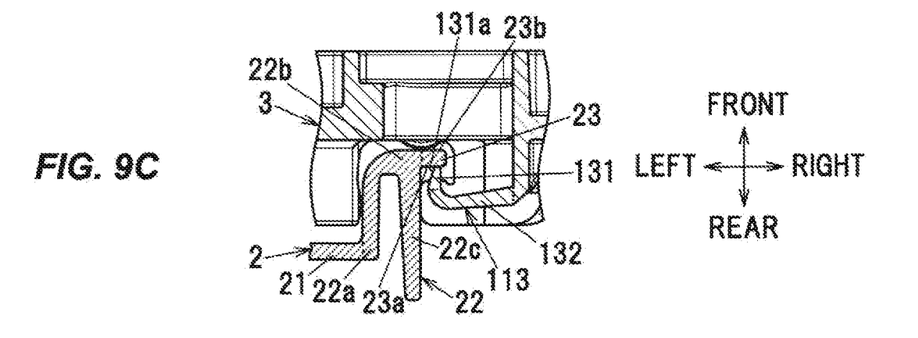
FIG. 9C is a cross sectional view showing a sixth modification of the back surface sliding fin.
Figure 9D:
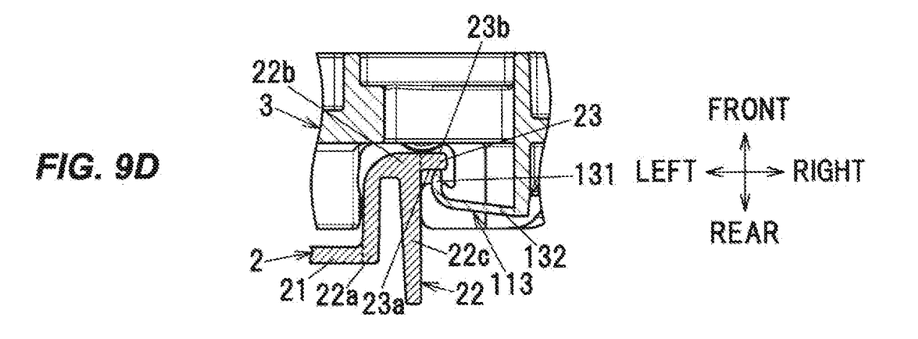
FIG. 9D is a cross sectional view showing a seventh modification of the back surface sliding fin.

Furthermore, the base portion 132 may be formed in a straight shape that extends straight to the left as shown in FIG. 9B, or the base portion 132 may have a tapered shape that extends straight to the left and has a thickness gradually decreasing from the base side to the end side as shown in FIG. 9C. Furthermore, the base portion 132 may be formed in a straight shape that extends diagonally straight in the left front direction, as shown in FIG. 9D.

Although the invention is applied to the window regulator 1 provided with the resin guide rail 2 in the embodiment described above, the invention may be applied to a window regulator provided with a metal guide rail.

In addition, although the invention is applied to the single-rail window regulator 1 in the embodiment described above, the invention may be applied to a double-rail window regulator provided with two guide rails.

Furthermore, although the invention is applied to the window regulator for raising and lowering the window glass G of the automobile in the embodiment described above, the invention may be applied to a window regulator for raising and lowering the window glass G of a railway vehicle as long as it is a window regulator for raising and lowering the window glass G of a vehicle.

Although the embodiment of the invention has been described, the invention according to claims is not to be limited to the embodiment. Further, please note that all combinations of the features described in the embodiment are not necessary to solve the problem of the invention. The invention can be appropriately modified and implemented without departing from the gist thereof.

REFERENCE SIGNS LIST

1 WINDOW REGULATOR
2 GUIDE RAIL
3 CARRIER PLATE
4 ASCENDING-SIDE WIRE
5 DESCENDING-SIDE WIRE
6, 7 PULLEY
9 DRIVE UNIT
23 FLANGE PORTION
23a BACK SURFACE
23b FRONT SURFACE
111 FIRST FRONT SURFACE SLIDING FIN
112 SECOND FRONT SURFACE SLIDING FIN
113 BACK SURFACE SLIDING FIN
131 CONTACT PORTION
131a INCLINED SURFACE
132 BASE PORTION
G WINDOW GLASS

The invention claimed is:

1. A window regulator, comprising:
a guide rail along an ascending and descending direction of a window glass;
a carrier plate to slide on the guide rail to move with the window glass; and
a raising and lowering means to raise and lower the carrier plate along the guide rail, wherein the carrier plate comprises a front surface sliding member configured to slide on a front surface of a flange portion of the guide rail and a back surface sliding member configured to slide on a back surface of the flange portion,
wherein the back surface sliding member comprises a contact portion coming into contact with the back surface and a base portion that is elastically deformed in a direction away from the flange portion and presses the contact portion against the back surface by a restoring force of elastic deformation,
wherein the contact portion extends toward the back surface,
wherein, when assembling the carrier plate to the guide rail, the contact portion is elastically deformed and bent on an end side toward a cross direction crossing an extending direction thereof to allow the flange portion to enter between the front surface sliding member and the back surface sliding member from the cross direction, and
wherein, when the flange portion enters between the front surface sliding member and the back surface sliding member, the contact portion returns to a natural state while causing elastic deformation of the base portion in the direction away from the flange portion by the restoring force of elastic deformation.

2. The window regulator according to claim 1, wherein the contact portion comprises an inclined surface on a lateral surface thereof on a side from which the flange portion enters between the front surface sliding member and the back surface sliding member, the inclined surface being inclined toward the end side in an entry direction of the flange portion.

* * * * *